Aug. 26, 1969   H. ADDISON   3,463,191
LIQUID CONTROL VALVE
Filed Dec. 9, 1966   3 Sheets-Sheet 1

HARRY ADDISON
Adams Cuayna & Hauger
ATTORNEYS

Aug. 26, 1969
H. ADDISON
3,463,191
LIQUID CONTROL VALVE
Filed Dec. 9, 1966
3 Sheets-Sheet 2
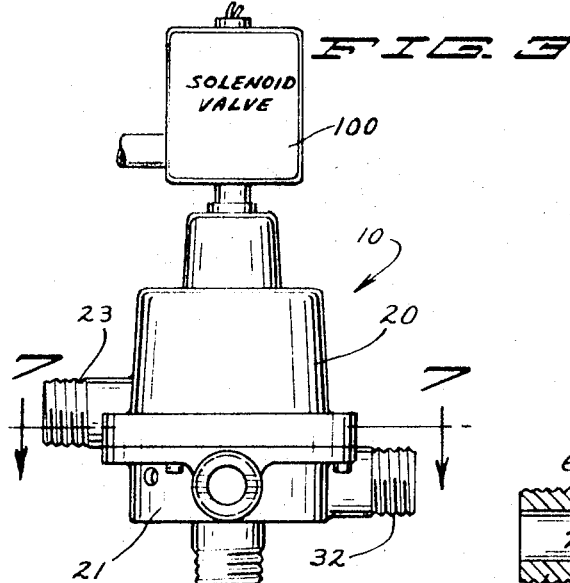
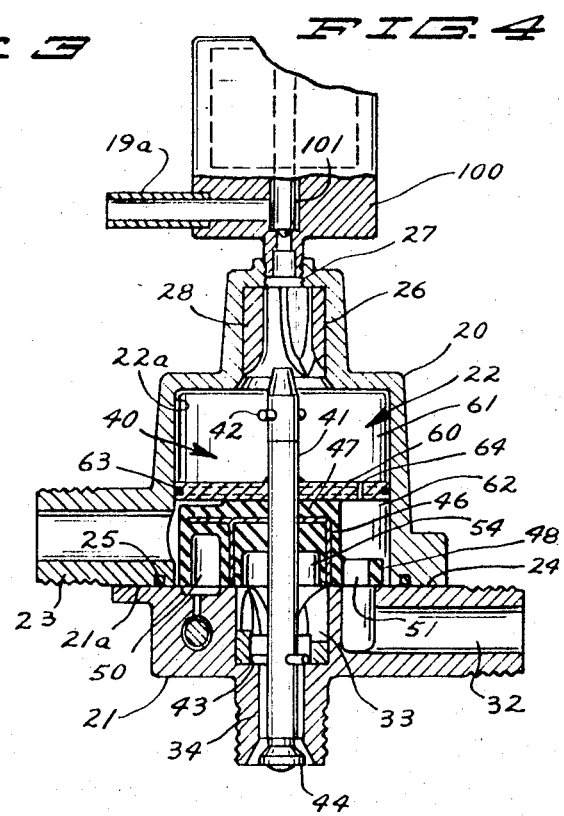
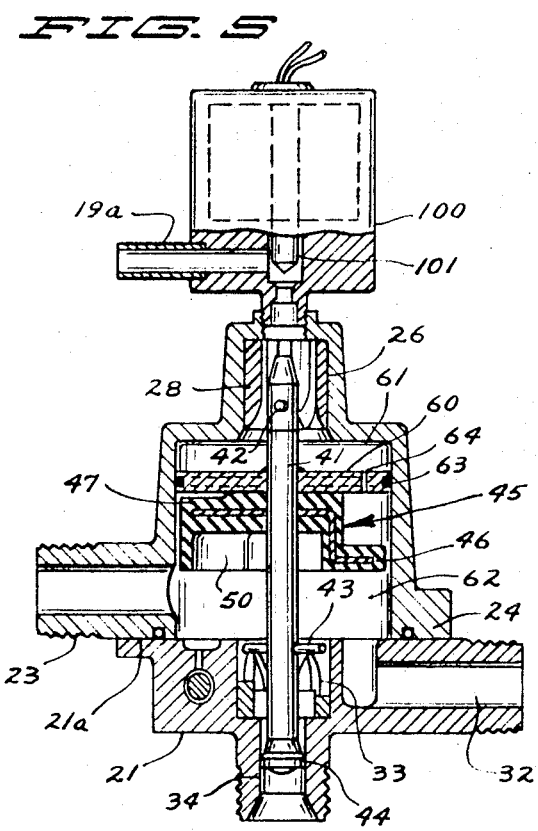
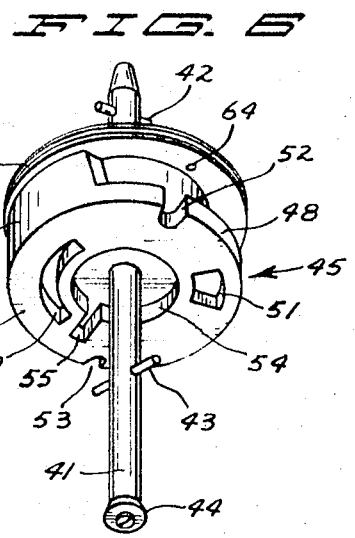
HARRY ADDISON.
Adams Cmayne+Haugen
ATTORNEYS

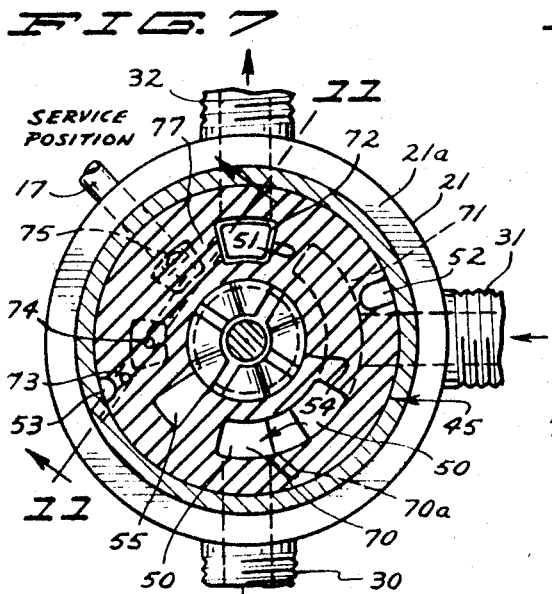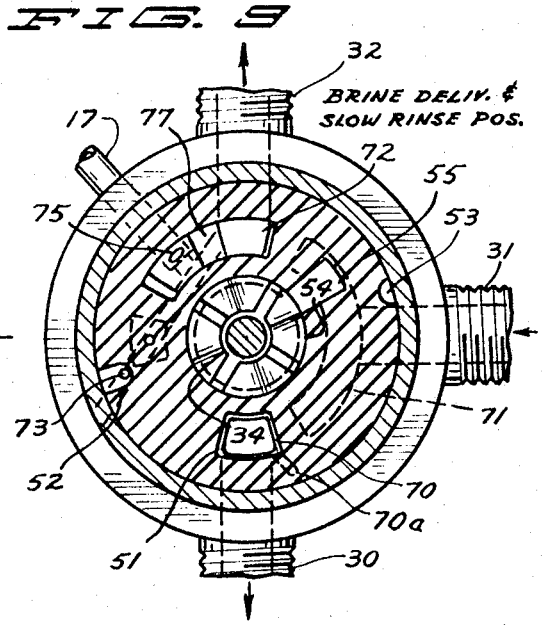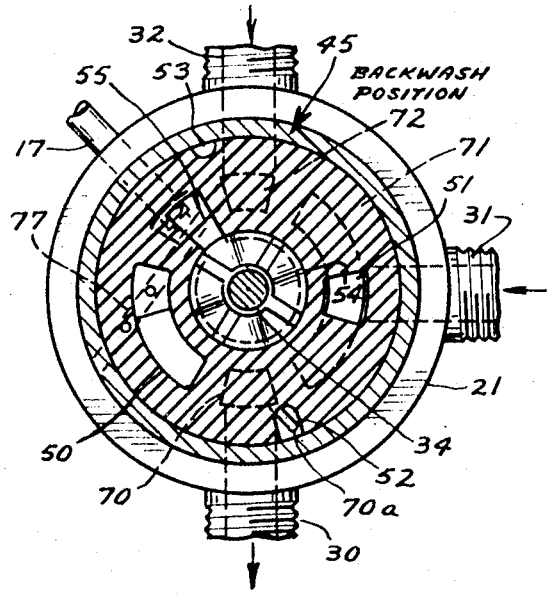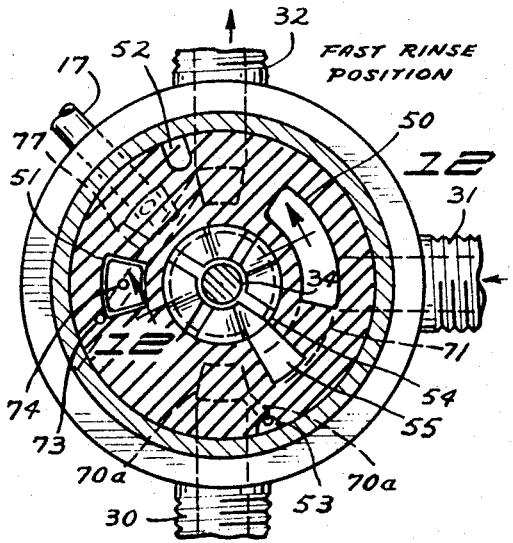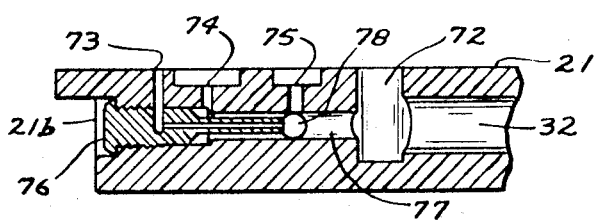

United States Patent Office 3,463,191
Patented Aug. 26, 1969

3,463,191
LIQUID CONTROL VALVE
Harry Addison, 206 W. Marshall,
Marshall, Minn. 56258
Filed Dec. 9, 1966, Ser. No. 600,434
Int. Cl. F16k 11/18; G04c 23/08
U.S. Cl. 137—625.29                          2 Claims

ABSTRACT OF THE DISCLOSURE

A liquid control valve for controlling fluid flow to a number of individual conduits including a valve member provided for reciprocating movement within a housing with a piston associated therewith to control the reciprocation with means for controlling the pressure on opposite sides of the piston whereby the reciprocation is attained with means for rotating the valve member during the reciprocation thereof and the valve member provided with at least a resilient exterior surface for sealing against the seating portion of the housing.

---

This application contains subject matter common to my prior co-pending application Ser. No. 363,060 filed Apr. 22, 1964, now abandoned.

Various valves have been designed for modifying and controlling the flow into and out of water softener units. Water softening units which are designed for automatic, periodic, regeneration operations are widely employed in the water softening industry today and applicant's control valve is directly related to use in such water softening units. Water softener valves presently in existence are for the most part relatively complex and usually require an additional driving system for properly completing the regeneration and shifting of communication between the ports thereof during the various regeneration cycles. Applicant's valve is, in comparison to these valves, a relatively simple unit which does not require any complex mechanism for properly shifting a controlling valve member but rather relies upon a camming structure which, upon oscillation of the valve, properly shifts the valve into any of the desired positions. The shifting mechanism applied by applicant includes a pressure release device whereby the entering fluid flow shifts the valve into a first position and upon closing of the pressure apparatus shifts the valve into the next desired position which position is, of course, arranged in accordance with the operations of the softening unit.

In accordance with these operational functions of the unit a unique drainage system is arranged for draining various parts of the softener system at the various operational steps. This drainage system is arranged in substantially integral relationship to the valve member and operates in conjunction with the reciprocation thereof to provide a drain valve always positively controlled with relation to the position of the valve member thereby affording a positive control of the drain and a relatively simple drainage control system which does not rely upon any auxiliary control mechanism for the control of the drain valve.

It is therefore an object of the present invention to provide an approved liquid flow control valve which utilizes a substantially simple main valve member for controlling the flow of water through a plurality of conduits for proper operation of a water softener unit which is sequentially operated to shift the valve member to properly perform the various functions of the softening unit.

It is still a further object of applicant's invention to provide an improved liquid flow distribution valve adapted to control fluid flow through a complex conduit transmission system wherein the valving system incorporates a means for controlling the drainage arrangement of the system without requiring any additional drain operating control members.

It is still a further object of applicant's invention to provide an approved valve member for a fluid transmission system wherein the positioning of the control valve member thereof is obtained through a camming structure which cam serves to shift the valve member upon reciprocation of the valve member.

It is still a further object of applicant's invention to provide a valving member for a fluid transmission system which includes an internal strengthening core completely enclosed by a resilient material which resilient material not only provides a flexible sealing surface to eliminate other gasketing materials within the unit but also protects the inner support core against chemical reaction with the controlled water.

These and further objects of the present invention will become apparent to those skilled in the art upon a study of the following specification, appended claims and accompanying drawings wherein like numerals are used to represent identical parts throughout the figures and, wherein;

FIG. 3 is a side elevation of the valve housing and control section for the valve disclosed herein;

FIG. 4 is a vertical section taken substantially along 4—4 of FIG. 2;

FIG. 5 is a view similar to FIG. 4 illustrating the unit in a shifting position, the valve member thereof being displaced upwardly;

FIG. 6 is a perspective view of the control valve member embodying the concepts of applicant's invention;

FIG. 7 is a view taken substantially along line 7—7 of FIG. 3 illustrating the valve and the associated members thereof in a service position;

FIGS. 8, 9 and 10 are views similar to FIG. 7 illustrating particularly the back wash, brine delivery and slow rinse, and fast rinse valve positions respectively;

FIG. 11 is a section taken substantially along line 11—11 of FIG. 7 particularly illustrating the Venturi portion of the valve.

Figure 1:
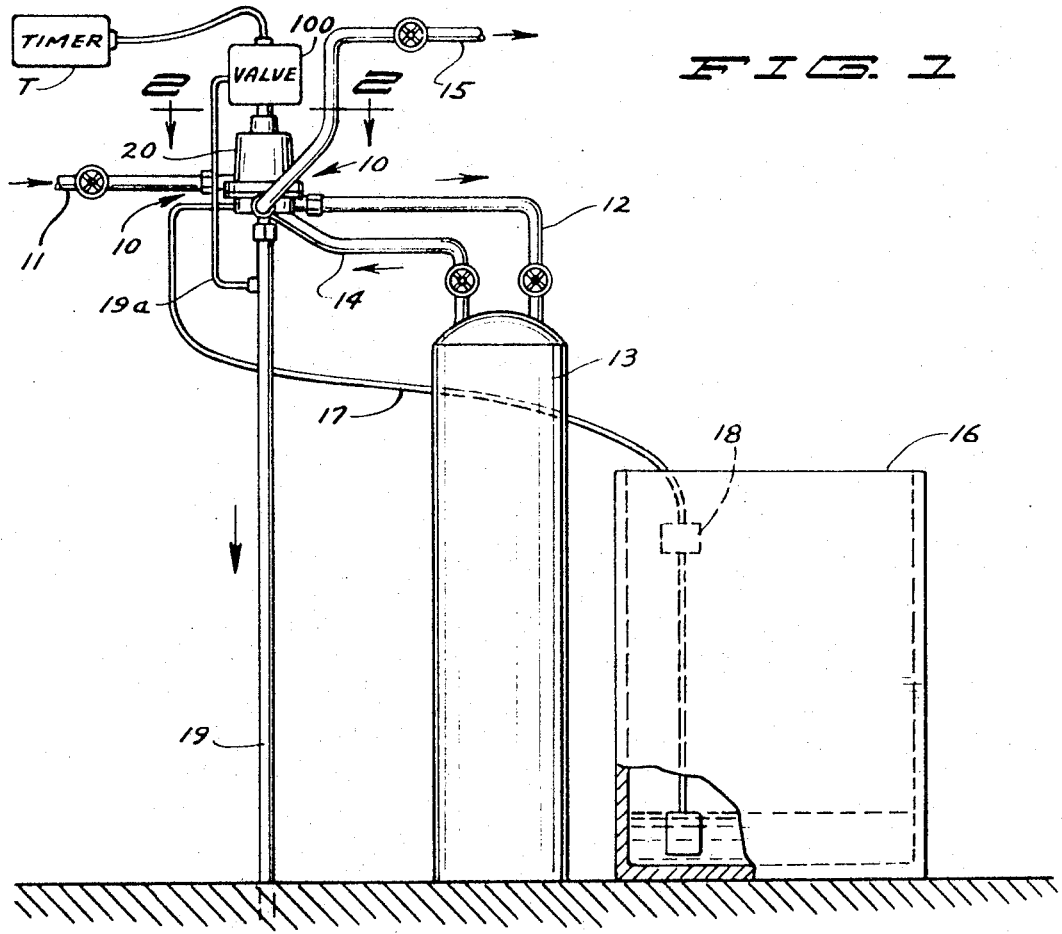
FIG. 1 is a diagrammatic illustration of a water softener system in which a valve employing the concepts of applicant's invention may be incorporated for control thereof.

In accordance with the accompanying drawings, the valve generally designated 10 employing the concepts of applicant's invention is illustrated in use with a complete diagrammatically illustrated water softener system, which system includes a raw water inlet 11, a conduit 12 for delivering water ot the top of the softener tank 13 wherein this water will be softened, a softened water delivery line 14 extending from the tank 13 back to the valve 10 and a service line 15 extending from the valve 10 to deliver the softened water to areas of service. A recharging or regenerating brine supply tank 16 is provided for periodic recharging of the softener with a proper brine solution and this tank 16 communicates with the softener tank 13 through valve 10 through utilization of a Venturi type draw-off conduit 17 associated with and receiving brine solution through a brine valve 18 in tank 16. Also supplied with this system is a drain line 19 to drain water from the valve under certain operative conditions of the valve and a substantially smaller drain line 20 designed to receive water from a solenoid valve 100 or the like stationed atop the applicant's valve 10. In order to control the periodic regeneration of the softener tank 13 a timer mechanism 22 is supplied to control the solenoid valve 100. This entire combination is certainly well known in the water softener art and an operative description of this system will be more thoroughly given hereinafter.

The valve member 10 includes a two part housing member including an upper housing 20, and a lower housing 21 wherein the upper housing 20 defines an internal longitudinal extending chamber portion 22 having a raw water inlet 23 delivering fluid thereto at the lower marginal portion 22a of chamber 22. The lower portion of the housing 20 defines a substantially planar flange 24 for sealing against the bottom housing element 21 and a seal member 25 may be provided in the seal surface 24 for proper sealing against housing 21.

A camming area 26 is provided in upwardly spaced relation from and communicates with chamber 22 such that water may flow therethrough. A threaded passage 27 is formed in the upper marginal surface of housing 20 above area 26 to receive a solenoid valve member 100 therein. Within the camming area 26 a set of 4 cam elements 28 are provided which cam elements are specifically illustrated in FIG. 12. These cam elements 28 will be described hereinafter when the cam elements in the lower housing element 21 are likewise described.

The solenoid valve member 100 includes a magnetically responsive plunger member 101 controlling communication between the cam chamber 26, passage 27 and the drainage conduit extension 19a which communicates in turn through conduit 20 with the main drain member 19. Solenoid valve 100 is actuated periodically by the timer member 22 and upon actuation thereof will open to release the pressure within chamber 22 as will be described hereinafter.

Figures 2, 12:
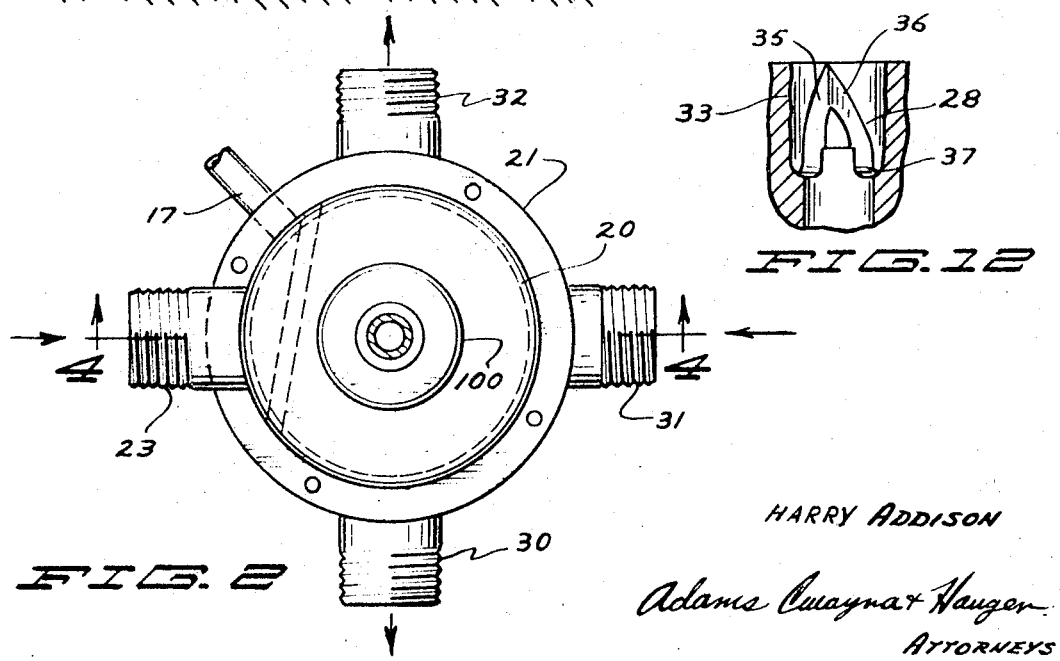
FIG. 2 is a horizontal section taken substantially along line 2—2 of FIG. 1 and is essentially a plan view of the valve discussed herein.
FIG. 12 is a vertical section taken substantiallly along line 12—12 of FIG. 10 particularly illustrating one portion of the camming locating device of the unit.

The lower valve housing member 21 includes a plurality of inlet flow conduits. These flow conduits are best illustrated in the plan view of FIG. 2 and the FIGS. 7–10 which show the operational features of the valve. As illustrated in FIG. 2 a service conduit 30, a conduit to provide connection to the softener tank bottom 31 and a conduit to supply water to the softener tank 13 top are provided on housing 21 to provide the complete conduit system required for a softener valve. Conduits 23, 30, 31 and 32 are arranged for connection to the conduits 11, 15, 14 and 12 respectively.

In addition to these conduits, internal coring of housing 21 is provided to permit communication between the various conduits and likewise to permit communication between these conduits and the Venturi line 17 extending upwardly from the brine valve 18 in the brine tank 16. These particular coring arrangements will be discussed hereinafter in an operational discussion of the valve.

Arranged generally centrally of the bottom housing member 21 is a cam chamber 33 communicating with a drain passage 34 which drain passage is connected directly to conduit 19. In the form shown the cam chamber 33 again provides a plurality of 4 arcuately spaced cam members 28 therein which cam members 28 are directed respectively upwardly for the bottom such cam member 33 and downwardly and oppositely for the aforementioned upwardly spaced cam chamber 26. Each of the individual cams 28 employs a generally triangular figuration to provide a pair of guiding edges designated respectively 35, 36 which cam surface 35 guides the cam follower moving therein while the follower is moving in an upward direction and upon downward reciprocation the cam follower is picked up by cam surface 36 to provide a revolving type of action on the cammed element. Cam follower rest areas 37 are provided at the lowermost edges of the cam surface and cam chamber 33 such that the cam follower may rest securely therein when not being reciprocated.

The main control member of the valve is designated 40 and includes a longitudinally extending shaft member 41 having a pair of spaced cam followers 42, 43 arranged respectively thereon in radially disposed relationship thereon to abut with the respective cam elements 33 arranged in the upper and lowermost cam housing sections 26, 33. It should be noted that the space between cam followers 42, 43 is such that at no time is the longitudinal shaft 41 without cam control. In other words, as the cam and shafts are shifted upwardly they will not leave the lower cams until the uppermost follower 42 is engaged by the uppermost cams and likewise on the lowering of the unit the lower cam follower 43 will abut with the lower cams before the upper cam follower 42 leaves the upper cams. In other words, there is control motion for the shaft 41 at all times.

Extending below the lever cam follower 43, shaft 41 extends longitudinally to a sealing seat member 44 which seat member being shiftable therewith serves to open and close the drain 34 connected to conduit 19. Naturally when the shaft 41 is in its upward position said drain conduit 34 will be closed as illustrated particularly in FIG. 5 and when the shaft 41 is in a lower position as illustrated in FIG. 4 the passage 34 will be open.

The main valve element 45 as illustrated in the drawings is positioned intermediate the cam followers 42, 43 and includes in the form shown a preformed support skeleton 46 having the proper passages formed therein and which skeleton is entirely encapsulated in a resilient material 47 such as rubber or the like.

Valve member 45 is provided with a particular shape and pasage configuration as particularly illustrated in FIGS. 4, 5 and 6, and which is operatively illustrated in FIGS. 7–10. As illustrated in the drawings valve member 45 includes a substantially accurately extending planar flange member 48 having a sealing surface 48a substantially planarly arranged at the bottom thereof to meet with and seal against the uppermost surface 21a of the bottom housing member 21. A first boss member 49 is arranged in upstanding relationship to flange 48 and a first groove 50 is provided therein which groove is of an arcuate width to cover a certain predetermined angle. A passage 51 is formed in substantially diametrical opposition to groove 50 and extends entirely through flange 48. A first notch 52 is provided to extend upwardly through flange 48 and is arranged to lie intermediate groove 50 and passage 51. A second notch 53 is provided through flange 48 and this notch is of substantially shorter radial dimension than notch 52 and is arranged in substantially diametrically opposed relation thereto. A drainage passage 54 is formed generally upwardly centrally of the flange 48 and a radially extending slot 55 extends outwardly therefrom, which slot 55 is arranged intermediate the grove 50 and notch 53. It should be obvious that the upward extension of these various passages permits the flow of water upwardly from the lower housing member 21 either through the flange portion 48 into the chamber 22 or to flow upwardly for communication about the central drainage aperture 34 or in the case of groove 50 to flow upwardly for further controlling of the flow by valve 45 for transfer to additional openings in the valve housing 21.

A piston member 60 is provided in closely spaced upwardly disposed relationship to the valve member 45 and is fixedly connected to shaft 41 and is positioned along shaft 41 such that in the downwardmost position of valve 45 the piston 60 will divide the housing 22 into two individual chambers designated respectively 61 which chamber acts as a pressure chamber and chamber 62 which acts as a flow chamber. For this proper division of chambers, piston 60 must, of course, be at least slightly upwardly of the entering raw water conduit 23. A seal member 63 is arranged in circumstantial relationship about the piston 60 to seal against the inside walls 22a of chamber 22 and a longitudinal passage 64 is provided through the piston 60 to permit at least limited slow flow of water from the flow chamber 62 upwardly through passage 64 into the pressure chamber 61.

A general operation of the valve should be obvious from this description and a simple operative statement would be as follows:

Assuming that the solenoid valve is de-energized the plunger 101 thereof will be in closed position thus sealing off the entire pressure chamber 61. Raw water entering through the inlet 23 will flow into flow chamber 62 for direction as discussed hereinafter and a portion thereof will flow upwardly into pressure chamber 61 through passage 64 in piston 60. This pressure accumulation will, of course, serve to force the piston 60 and associated valve member 45 downwardly against the lower housing seating surface 21a. This downward pressure is obtained by the larger piston area above the piston 60. When it is the desire to change the position of valve member 45 the solenoid valve 100 is energized and the drain passage 19a from pressure chamber 61 is opened. The difference in passage diameters between drain 19a and inlet 64 permits the drainage of fluid more rapidly than the fluid will enter pressure chamber 61 and the pressure now exerted against the downwardly disposed face of piston 60 from flow chamber 62 will urge the same upwardly. As the piston 60 is urged upwardly the cam followers 42, 43 will be respectively shifted ⅛ of a turn on their upward stroke due to the cam action of cams 28 and after attaining this upper position the solenoid valve will be de-energized thereby closing the drain plunger 101 and allowing fluid pressure to again build up in the pressure chamber 61. This buildup is obtained due not only to the fact that at all times when the valve member 45 is displaced upwardly fluid is free to pass therearound but also is free to pass through passage 51, notches 52 and 53 and passage 64 to exert a pressure against the top of piston 60. This buildup of pressure will force the piston and associated valve memer 45 downwardly and on the downward stroke another ⅛ of a turn rotation will be accomplished due to the disposition of the cam members in the lower housing 21.

It should be noted that during the upward stroke of the valve member 45 and piston 60 the drain conduit 34 has been closed by the drain plug 44. If this were not so it would be obvious that a great deal of the inlet water would be escaped through the drain conduit 34 and 19.

The lower housing member 21 has a plurality of passages formed therethrough which passages extend upwardly to the sealing surface 21a thereof. These passages are illustarted in the operative positions in FIGS. 7, 8, 9, 10. As illustrated a first passage 70 is formed through the housing 21 to communicate with the service conduit 30. This passage 70 also includes a substantially regularly extending slot 70a which likewise communicates with service passage 30. A substantially larger arcuate slot 71 is provided in housing 21 to communicate with the conduit 31 to deliver fluid to the valve 10 from the bottom of the softener tank 13. Again, what may be called a single unit passage 72 is provided to communicate with the conduit 12 to deliver water to the top of the softener tank 13. A plurality of substantially smaller passages designated respectively 73, 74 and 75 are provided for the Venturi action necessary to bring brine from tank 16 through the valve 18 for regenerating the softener tank 13 and these passages are illustrated in cross section in FIG. 11 wherein a Venturi nozzle 76 is provided through a side opening 21b in the housing and this Venturi nozzle 76 is received into a passage 77 which likewise connects all of the Venturi passages 73, 74 and 75. As illustrated this passage 77 also communicates with the conduit 32 extending to conduit 12 to deliver fluids to the top of the water softener tank 13. The Venturi feed line 17 extends into the housing and into passage 77 as at aperture 78.

The operation and functions of these various passages as best described in an operative statement as follows hereinafter.

In discussing the operation of the valve, it must be assumed that the various positions shown are when the valve member 45 has been displayed downwardly against the seat surface 21a of the lower housing 21 and the operative valve shifting portions have been completed.

In the service position it is, of course, desirable to feed a large supply of softened water to the actual place of consumption and raw water entering from conduit 23 passes about the valve system 45 downwardly through passage 51 of flange 48 of valve 45 into opening 72 to feed the conduit 12 to the top of the water softening tank 13. Water from the bottom of softening tank 13 is received into conduit 14 and connection 31 to flow into passage 71 in the housing 21 and upwardly into the directive groove 50 formed in the valve member 45. This soft water now is free to flow through groove 50 downwardly into passtge 70 in the housing and out of the service connection 30 and into the service line 15. This is the normal function of the softener but one more operation does exist during this service position.

As stated, aperture 72 in housing communicates with the passage 77 serving the Venturi system. The flow of water through passage 72 then is free to flow backward through conduit 77, out passage 78 and into conduit 17 connecting the brine supply tank 16 to the system. A simple float valve 18 as commonly known in the art is provided within the tank 16 and when a sufficient supply of water has been delivered to the tank 16 through conduit 17 the float valve 18 will close further delivery of water to the tank 16. This supply of water to the tank 16 mixes with the salt contained therein and a brine solution for the next regeneration process is provided.

The next procedural step is illustrated in FIG. 8 which shows the back wash position for the unit. During this step it is necessary to provide a supply of water to the service conduit and for this purpose notch 52 comes into registration with the slotted portion 70a of passage 70 and feeds service connection 30 and service conduit 15. The back wash is obtained by positioning the passage 51 directly over the back wash receiving conduit 71 to deliver water to the bottom of the softener tank 13 through connection 31 and line 14. In order to relieve this water delivered to the tank 13 it is, of course, necessary to provide some means for draining the same and, in this position the flow upwardly from tank 13 is received into the connector 32 to flow into valve 10 and will discharge, since no aperture of flange 48 permits flow through surface 21a through passage 77 upwardly through passage 75 and into the drain extension 55 and finally into the drain 54 for final disposition out of the drain conduit 34 of the valve 10. Since the valve member 45 is in this position downwardly on surface 21a the drain 44 is in open position with respect to passage 34 and free drainage is obtained thereto. It should be noted in this position that no flow is available through passage 50 as this is dead ended against the face 21a of the valve 10. It should also be noted that as the brine valve 18 has been closed no flow is available to the brine tank 16 through the conduit 78 and conduit 17, thus all the water delivered through aperture 72 from the top of the tank must flow outwardly from passage 75 into the drain system.

The next procedural step in the process is to provide a regeneration of salt to the brine tank 13. To obtain this there must again be a service of raw untreated water to the ultimate user and in this instance the valve member 45 has been rotated 90 degrees from the position shown in FIG. 8 and the aperture 51 through the flange 48 of valve 45 is now positioned directly over the aperture 70 communicating with outlet connections 30 and service line 15. To obtain brine delivery it is necessary to inject a raw supply of water through the Venturi nozzle 76. This water is obtained by positioning notch 52 directly over the passage 73 feeding the Venturi nozzle 76 and as the water flows therethrough the Venturi action is obtained which draws the salt solution from the brine tank 16 through conduit 17. The brine received from the conduit 17 will pass through the aperture 78 into passage 77 and out of the passage 72 into the connector 32 and line 12 to the top of the softener tank 13 where it will cascade over the material therein depositing the salt for proper regeneration of the mineral bed contained in the softener 13. As the salt and mixture thereof flows through the mineral bed in tank 13 the excess water after delivering the salt must be delivered to the drain. To accomplish this the drainage connection 55 is placed over the aperature 71 receiving fluid from the bottom of the tank 13 through line 14 and connector 31 and the water received therein is, of course, discharged to the central aperture 54 and finally downwardly through the drain member 34 arranged in aligned relation therewith. Again, the valve 45 being seated upon face 21a conduit 34 and plug 44 is open to permit such drainage. This position is termed a slow rinse feature due to the limited amount of water that will flow through the Venturi nozzle to enable the salt to be brought into the softener tank 13 and a fast rinse position follows directly hereinafter as illustrated in FIG. 10.

During this fast rinse position it is again necessary to provide raw water to the ultimate consumer and this is provided by aligning notch 53 in alignment with extension 70a of aperture 70 such that raw water will be delivered to the service connector 30. To obtain this fast rinse position the passage 51 is arranged over the aperture 74 and this water does not flow through the Venturi nozzle as illustrated in the cross section of FIG. 11 but rather is free to flow directly through passage 77 and into the top of the softener tank 13 through connection 32 and line 12. This fast rinse position provides more water than the slow rinse position as the water does not flow through the Venturi.

To remove this rinse water from the softener tank 13 the drainage extension 55 is arranged to communicate with the passage 71 communicating with the bottom of the water softener tank 13 through connector 31 and conduit 14. As illustrated in this position, capturing groove 50 is also arranged in communicating relation to this aperture 71 but as this is a dead end groove no flow will exist to any other portions of the valve.

The flow then of the water through this passage 55 is outwardly through the drain 54 and ultimately through the drain passage 34. Again, the lower closure member 44 is in downward position to permit the drain of water directly therethrough.

It should be noted that the size of the passages 52, 53 through the flange of the valve 45 must be of substantially different radial dimensions. As illustrated in FIG. 1, passage 53 does not afford communication to the Venturi opening 73 while as illustrated in FIG. 9 passage 52 is large enough to permit water to flow into the Venturi nozzle 73. Again, both of these passages must be of such a size as illustrated in FIGS. 8 and 10 to communicate with the extension 70a to deliver raw untreated water to the ultimate consumer in both the back wash and the rinse positions.

It should be obvious that applicant has developed a water softener valve wherein the various positions of the valve are determined simply by a pressure releasing function whereas the pressure of the inlet fluid delivered to the valve serves to exert a first shifting motion which shifting motion is controlled and governed by a pair of cam members for rotating the valve into the various selective positions and which thereby eliminates any other mechanical shifting means usually associated with such water softener valves. The valve, as disclosed herein, further provides a unique means for controlling the drainage system normally required with such a water softener system. The drainage system in this instance is directly associated with, and is integral to, the valve member for positive actuation therewith upon shifting of the valve member. This particular structure is further considered to be unique in that the drainage system is closed upon shifting of the valve unit and therefore a function of the valve shifting is to eliminate unnecessary drainage of water through cooperation of a drainage control system.

The rubber or resiliently encapsulated frame member provides a unit which is also unique in its construction in that no sealing devices are necessary to properly seal the unit against the valve sealing surfaces. Rather, the unit contains an integral self-sealing device which not only affords proper sealing between the directional control factors of the valve but also affords proper sealing between the various flow controlling passages thereof by simply providing a basic skeleton system covered by a resilient surface member.

It should be obvious that applicant has provided a new and unique fluid flow valve for controlling the flow through a plurality of conduit members which flow-through system includes a unique, resiliently covered valve member covering a basic skeleton valve structure which unit serves to completely encapsulate the valve structure, therefore retarding any water reaction effects thereon while protecting the skeleton and while also providing a positive seal between the various portions of the valve.

It will, of course, be understood that various changes may be made in the form, details, arrangements and proportions of the parts without departing from the scope of the invention as set forth in the appended claims.

What I claim is:

1. A liquid control valve for modifying and controlling flow to a plurality of conduits, said valve including:
   (a) a housing defining:
      (1) a valve seat;
      (2) a plurality of passages communicating respectively with the conduits, said passages opening through said valve seat;
      (3) a pressure chamber arranged in overlying relationhip to said valve seat, said housing defining means for admitting fluid to be controlled into said chamber;
      (4) a pressure relief passage arranged in the uppermost portion of said chamber;
   (b) a valve member sealingly, slideably arranged in said chamber for moving into and out of sealing relationship with said seating surface and having:
      (1) a plurality of control passages thereon for controlled opening and closing of the passages through said seating surface; and
      (2) means defined interiorly of said housing to permit limited flow of fluid to said pressure chamber above said valve member whereby pressure will normally force said valve member into seated sealing position;
   (c) means for periodically releasing pressure from said chamber through said relief passage to permit said valve member to move out of sealing relationship with said sealing surface;
   (d) the relief passage in said chamber being of a first dimension and said means to permit flow interiorly of said housing is of a dimension substantially less than said relief passage;
   (e) means for indexing and positioning said valve member as the same as moved into and out of sealing relation with said valve seat for controlling of the passages through said valve seat, said means including:
(1) first indexing and means in overlying relation to said valve member; and
(2) second indexing and positioning means in underlying relation to said valve member.

2. The structure set forth in claim 1 and said valve member including piston, directly adjacent thereabove, in sliding sealing engagement with said chamber, said means to permit limited flow of fluid to said pressure chamber being defined through said piston and said piston and valve member being arranged between said first and second indexing and positioning means.

References Cited

UNITED STATES PATENTS

| | | | |
|---|---|---|---|
| 2,738,807 | 3/1956 | Addison | 137—624.18 X |
| 2,825,363 | 3/1958 | Bird | 137—625.46 X |
| 2,833,309 | 5/1958 | Bird | 137—625.96 |
| 2,870,788 | 1/1959 | Hull | 137—624.18 X |
| 3,105,518 | 10/1963 | Kunz | 135—625.46 X |
| 2,209,989 | 8/1940 | McCanna | 251—358 X |

ALAN COHEN, Primary Examiner

U.S. Cl. X.R.

137—624.18, 625.31